United States Patent [19]

Breunig et al.

[11] Patent Number: 5,187,947
[45] Date of Patent: Feb. 23, 1993

[54] WHEEL TYPE FREEZER AND METHOD FOR RAPID, LOW TEMPERATURE FREEZING

[75] Inventors: Timothy A. Breunig; Gary H. Anders, both of Hutchinson, Kans.

[73] Assignee: Doskocil Companies Incorporated, South Hutchinson, Kans.

[21] Appl. No.: 776,997

[22] Filed: Oct. 16, 1991

[51] Int. Cl.⁵ ............................................. A25D 25/04
[52] U.S. Cl. ........................................ 62/346; 62/381; 426/517; 426/524
[58] Field of Search ................... 62/381, 346; 426/517, 426/524

[56] References Cited

U.S. PATENT DOCUMENTS

| | | |
|---|---|---|
| 2,141,462 | 12/1938 | Doering . |
| 2,749,722 | 6/1956 | Knowles . |
| 2,900,804 | 8/1959 | Rising . |
| 3,048,987 | 8/1962 | Wentworth . |
| 3,089,316 | 5/1963 | Robbins . |
| 3,262,217 | 7/1966 | Brown . |
| 3,263,339 | 8/1966 | Brown . |
| 4,138,768 | 2/1979 | Roth . |
| 4,192,899 | 3/1980 | Roth . |
| 4,294,860 | 10/1981 | Roth . |
| 4,337,627 | 7/1982 | Roth . |
| 4,349,575 | 9/1982 | Roth . |
| 4,377,936 | 3/1983 | Gram . |
| 4,446,159 | 5/1984 | Roth ............................... 426/524 X |
| 4,468,281 | 8/1984 | Bender . |
| 4,539,824 | 9/1985 | Kuraoka ........................ 426/524 X |

OTHER PUBLICATIONS

Two page brochure entitled "Freeze Wheel System" (undated).
Two pages of development drawings dated Nov. 9, 1989 and Nov. 10, 1989.
One page drawing dated Jan. 15, 1992 and entitled "Cross Flow Drum Ass'y".

Primary Examiner—Alan Cohan
Attorney, Agent, or Firm—Shook, Hardy & Bacon

[57] ABSTRACT

A freeze wheel is provided with an outer skin on which a food or other type product is placed to be frozen. A chamber is formed adjacent the outer skin and a plurality of nozzles project into the chamber for directing a refrigerant onto the inner surface of the skin. The refrigerant flow is controlled to provide a uniform flow pattern along the inner surface to strip away a boundary layer of fluid and maximize heat transfer across the outer skin. The nozzles are arranged in a series of concentric rings with the nozzles in alternate rows lying in common radial planes. An interior portion of the wheel is closed off by one or more doors which may be opened to allow cleaning of the wheel.

33 Claims, 3 Drawing Sheets

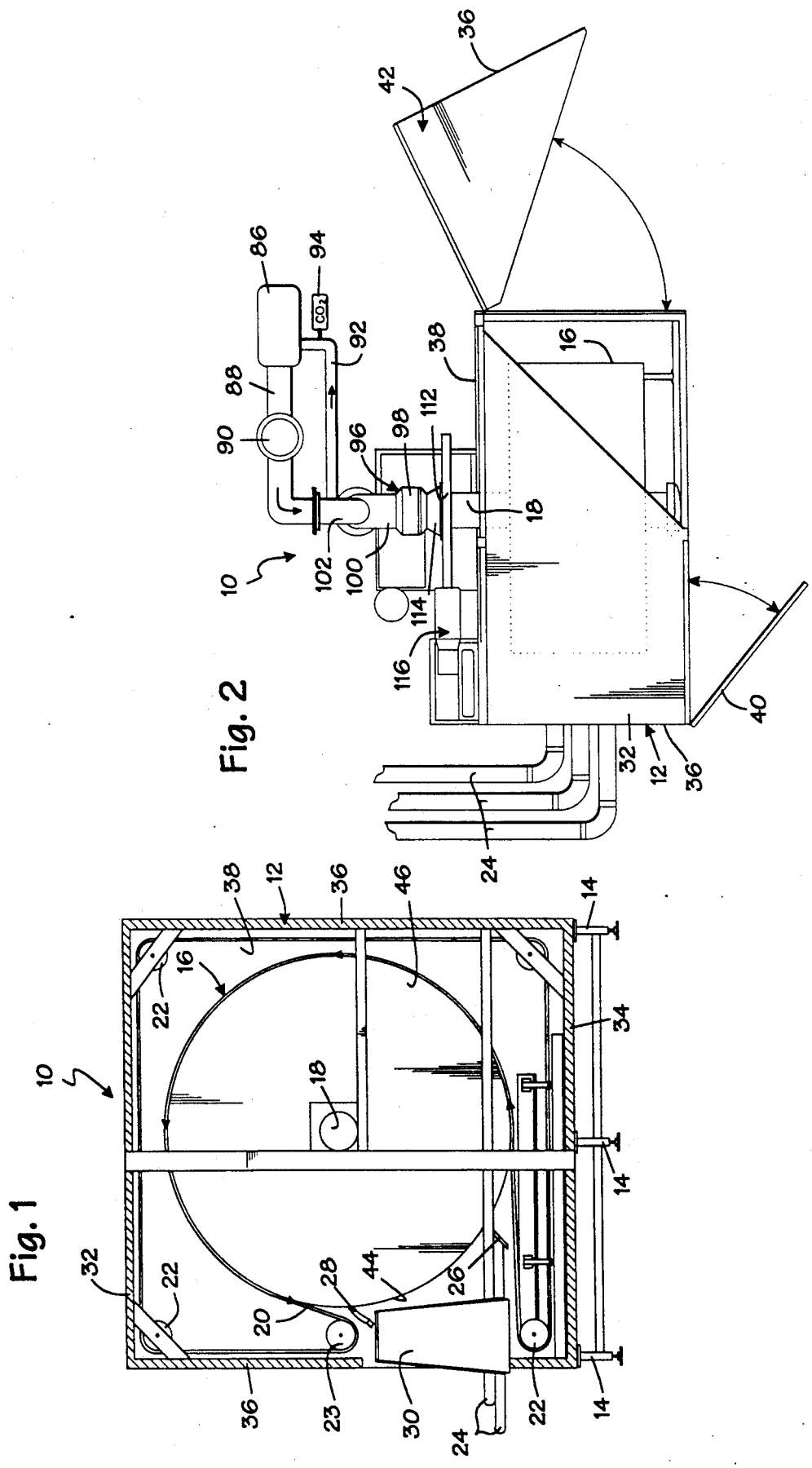

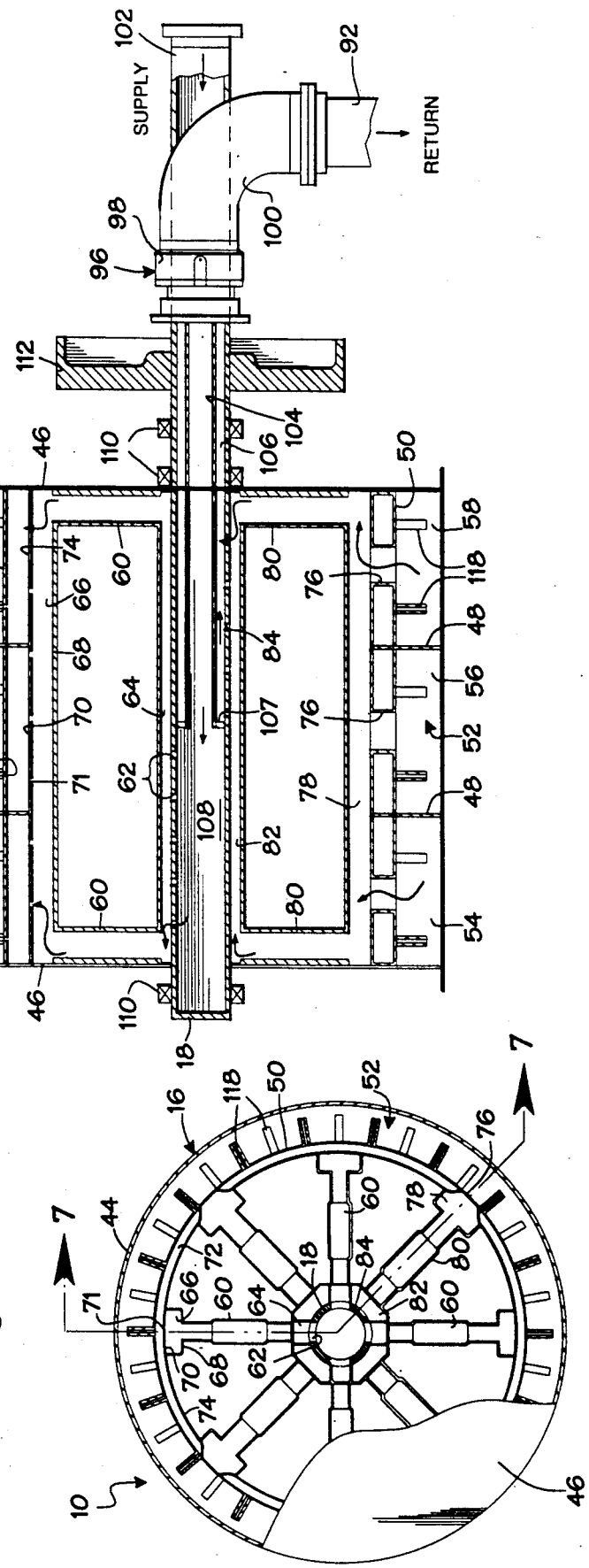

WHEEL TYPE FREEZER AND METHOD FOR RAPID, LOW TEMPERATURE FREEZING

BACKGROUND OF THE INVENTION

This invention relates generally to equipment for the freezing of foods and other substances and, more particularly, to a wheel or drum type freezer and method of operating same to achieve very low temperatures and high heat transfer rates.

The use of drum or wheel type freezers for the rapid freezing of foods is illustrated in U.S. Pat. No. 4,192,899 to Roth. The freezer disclosed in that patent generally comprises a revolving drum having an outer skin of a smooth metallic material which has a high heat transfer capacity A refrigerant under high pressure is circulated through an interior area of the drum to cool the outer skin and the food product placed thereon The food product is in the form of a sheet of beef which is frozen and subsequent cut into patties Freezers of the type shown in the '899 patent are designed to provide at least partial freezing of the food product as it is carried along on the outer skin of the drum. Such freezers require only a limited amount of floor space in a commercial operation and also reduce the time required to freeze processed food products. This accelerated freezing is particularly desirable in that it reduces the amount of time that bacterial growth may occur while processed food is awaiting freezing.

The heat transfer rates that can be achieved by conventional drum type freezers for food products is determined in part by the circulation pattern of the refrigerant within the drum. Typically, the refrigerant is circulated through a peripheral chamber in contact with the inner surface of the drum's outer skin. Even at high refrigerant flow rates and pressures, a generally stationary boundary layer of refrigerant remains positioned adjacent the inner surface of the outer skin. This boundary layer of refrigerant has been warmed by the heat transfer across the outer skin and thus impedes heat transfer between the circulating refrigerant and the drum surface.

The use of a refrigerant circulation system for an ice making machine is disclosed in U.S. Pat. No. 2,900,804 to Rising. The ice machine shown therein utilizes a plurality of apertures in a wall of an annular chamber to direct the high pressure refrigerant radially outward against the inner circumferential wall of the drum. The liquid then travels across the length of the drum before it is directed to a center shaft for removal from the drum. While this type of a system facilitates heat transfer across the outer skin of the drum, the large spacing between the apertures and the circumferential wall causes the newly charged refrigerant to mix with warmer refrigerant that is flowing toward the exit channel. The temperature of the refrigerant contacting the wall is thus elevated and provides less efficient cooling of the drum surface. In addition, the migration of the spent refrigerant toward the exit channel at the end of the drum causes significant temperature variations along the drum surface. While this mixing of the refrigerant and the resulting temperature variations do not present a problem when freezing a substance such as water having a high freezing point and low incidence of bacterial growth, this concept is poorly suited for use to freeze food and other types of substances requiring much lower and more uniform freezing temperatures.

Conventional wheel type freezers such as disclosed in U.S. Pat. Nos. 4,192,899 and 2,900,804 discussed above operate under high pressures in order to maintain the heat transfer fluid in a liquid state. Such high pressures require that all fittings and components be of sufficient strength to withstand the pressure, thus adding significantly to the cost of those freezers The freezers must also undergo extensive testing and certification procedures in order to comply with governmental safety regulations because of the extensive injury which could occur should a fitting rupture and spray the low temperature fluid on nearby personnel or equipment.

SUMMARY OF THE INVENTION

It is an object of this invention to provide a freeze wheel which circulates refrigerant against an inner surface of the outer skin of the wheel in a manner to substantially prevent the formation of a stationary boundary layer of warmer refrigerant adjacent the inner surface so that heat transfer between the outer skin and the circulating refrigerant is significantly improved.

It is another primary object of this invention to provide a freeze wheel which cooled by a heat transfer fluid that is under low pressures so that the fittings and other components through which the fluid is circulated are subjected to far less pressure than conventional high pressure systems, thereby greatly reducing the likelihood of rupture of such components and resulting injury to equipment or personnel.

It is also an object of this invention to provide a freeze wheel having a uniform low temperature at substantially all locations across and around the entire outer skin of the wheel to ensure greater uniformity of cooling, including freezing, of a product, particularly a food product, placed thereon so that a more uniformly processed product is obtained.

It is a further object of this invention to provide a freeze wheel with an outer chamber in which a plurality of nozzles are positioned for directing the chilled heat transfer fluid directly onto an inner surface of the outer skin of the wheel to reduce the mixing of the chilled fluid with the warmed fluid flowing in the chamber, thereby ensuring that the lowest temperature refrigerant contacts the wall to provide maximum heat transfer across the skin.

It is another object of this invention to provide a freeze wheel having a high heat transfer capacity so that a product placed thereon may be frozen at a rate rapid enough to prevent or substantially reduce cellular damage to the product, thereby allowing the product, particularly a food product, to be returned to its previous freshness and consistency upon thawing.

It is yet another object of this invention to provide a freeze wheel having the capability of rapidly freezing a food or other type product and then further lowering the product temperature to very low temperatures at which certain undesired bacteria strains are killed so that the thawed product will have a significantly reduced count of such bacteria.

It is a still further object of this invention to provide a freeze wheel with a rotary union that allows the refrigerant to be directed to and from the freeze wheel along its axis of rotation and from the back side thereof so that the front side of the freeze wheel will be free of refrigerant flow pipes, thereby providing greater unimpeded aisle space around the freeze wheel.

It is yet a further object of this invention to provide a cover and one or more doors to enclose the freeze wheel to reduce the buildup of dirt, moisture, frost and other contaminants thereon, and which doors may be opened to provide ready access to the wheel when cleaning or inspection thereof is required.

It is still another object of this invention to provide a freeze wheel with an enclosing cover which permits the interior region containing the freeze wheel to be purged with an inert gas to prevent moisture formation and to provide a sterile atmosphere in the interior region.

To accomplish these and other related objects of the invention, in one aspect the invention relates to a freeze wheel comprising a circumferential skin for receiving a substance to be chilled or frozen, a chamber formed between the skin and a circumferential wall spaced from the skin, a plurality of nozzles protruding into the chamber for directing a refrigerant fluid from the chamber onto the skin, and a port in the circumferential wall for removing the refrigerant fluid from the chamber. The provision of nozzles for directing the fluid directly onto the skin of the wheel reduces the mixing of the low temperature refrigerant with warmed refrigerant in the chamber. A further aspect of the invention relates to arranging the nozzles in a pattern which prevents formation of a boundary layer of warmed refrigerant on the skin.

In yet another aspect, the invention relates to a method for operating the freeze wheel comprising the steps of rotating the wheel, applying a product to an exterior skin of the rotating wheel, circulating a refrigerant fluid through the wheel, cooling the exterior skin and product by directing the refrigerant fluid through a plurality of nozzles onto a surface of the exterior skin in a manner to substantially prevent the formation of a stationary boundary layer of refrigerant fluid adjacent the surface, and removing the cooled product from the exterior skin of the wheel.

The freeze wheel construction and method of operating same provide high heat transfer rates for rapidly cooling and freezing of a product. A plurality of circumferentially extending circulation zones may also be provided with one or more ports for removal of the warmed refrigerant fluid. This further reduces the mixing of the low temperature fluid with the warmed fluid to improve the heat transfer rates and to provide a more uniform cooling or freezing of the product. The heat transfer fluid preferably comprises 4-isopropenyl 1-methylcyclohexene, also known as limonene, which may be chilled by carbon dioxide injection to a temperature as low as $-110$ degrees F. This very low temperature operates to kill certain strains of bacteria in the product. In addition, the very low temperature in conjunction with the high heat transfer rates results in very little cellular damage to the product during freezing, thus allowing the product to be returned to its original consistency and texture upon thawing.

BRIEF DESCRIPTION OF THE DRAWINGS

In the accompanying drawings which form a part of the specification and are to be read in conjunction therewith and in which like reference numerals are used to indicate like parts in the various views:

FIG. 1 is a front elevational view of one embodiment of a freeze wheel in accordance with the present invention and taken along the axis of rotation of the wheel and shown with the doors removed;

FIG. 2 is a top plan view of the freeze wheel shown in FIG. 1 with movement of the doors illustrated by the arrows and product supply lines shown in fragment;

FIG. 6 is a slightly enlarged front elevational view of the freeze wheel shown in FIG. 1 and taken in vertical section to illustrate the arrangement of internal components; and FIG. 7 is a side elevational view of the freeze wheel taken along section line 7—7 of FIG. 6 in the direction of the arrows.

DESCRIPTION OF THE PREFERRED EMBODIMENT

Figure 4:
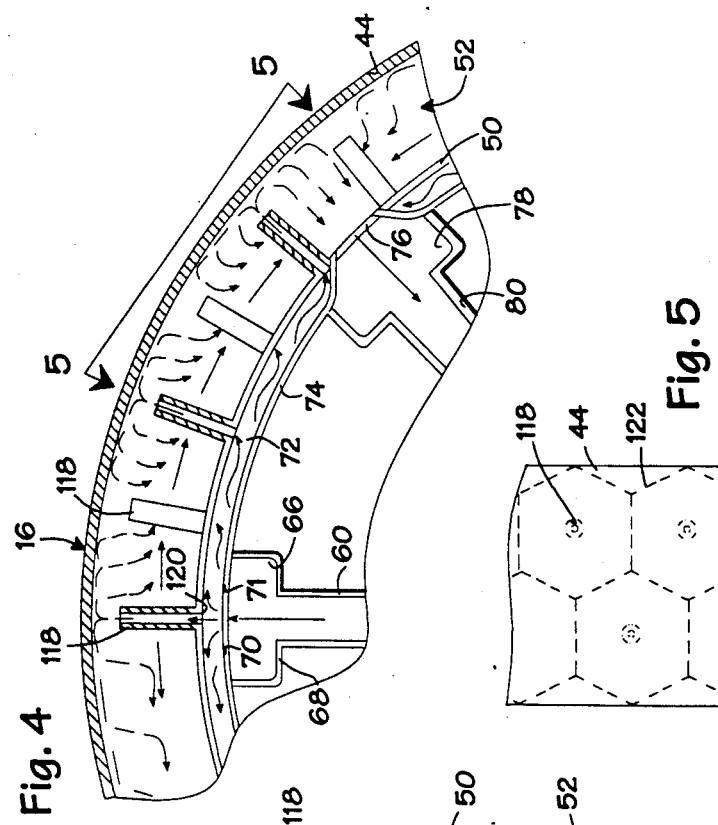
FIG. 4 is a further enlarged fragmentary front elevational view of a portion of the freeze wheel shown in FIG. 3 and with the circulation pattern of the refrigerant within the wheel represented by the arrows.

Referring now to the drawings in greater detail and initially to FIG. 1, a freezing apparatus in accordance with the present invention is represented broadly by the numeral 10. Freezing apparatus 10 includes a generally rectangular frame 12 and support legs 14 that are connected to the bottom of the frame.

The frame mounts a rotatable freeze wheel 16 which rotates about a center shaft 18 in a counterclockwise direction as viewed in FIG. 1. As used herein, the term "wheel" is intended to encompass devices having a generally cylindrical configuration as well as other types of configurations such as those having multiple sides. The term also encompasses devices which are also known as drums and are generally of a small diameter and may include a machined outer skin. An endless belt 20 having generally the same width as the freeze wheel 16 wraps around the wheel in a to the 10 o'clock position. A plurality of rollers 22 are provided for orienting belt 20 in the desired manner and a drive roller 23 is utilized for driving the belt.

A product to be frozen is directed from a plurality of supply lines 24 to an extruder horn 26 which is positioned above the belt 20. Rotation of belt 20 carries the product onto wheel 16 for rotation therewith and positioned between the belt and the wheel. The frozen product is then removed from the wheel surface after it has been carried through the desired arc of rotation by a scrapper 28 and is conveyed by a chute 30 or other mechanism away from freezing apparatus 10.

If desired, the product may then be delivered to another apparatus for further freezing. For example, for processing efficiency it might be desirable to only partially freeze a product using apparatus 10. The partially frozen product may then be conveyed to another freezing apparatus operated in tandem with apparatus 10. The product would then be oriented to place the unfrozen side into contact with the freeze wheel of the other apparatus to complete the freezing of the product.

It will also be appreciated that the product may be delivered onto the freeze wheel 16 at various positions. For example, a liquid product might be applied at the twelve o'clock or eleven o'clock position for a wheel rotating in the counterclockwise direction. The portion of the liquid product directly contacting the wheel would quickly freeze and the surface tension of the remaining liquid portion would cause the liquid to continue to adhere to the wheel as it rotates. The belt 20 would thus be unnecessary in such a situation. The scrapper 28 positioned at the appropriate position would then remove the completely frozen product after it has rotated through the necessary arc of travel.

Turning additional to FIG. 2, it can be seen that frame 12 has a top 32, a bottom 34, and sides 36 which are joined together to provide a four-sided cover for the freeze wheel 16 housed therein. The frame 12 also includes a back cover 38 which substantially encloses the back side of the frame. A portion of the front side of the frame is enclosed by a door 40 which is hinged along one of sides 36 and may be swung open to provide access to the freeze wheel 16. The other portion of the front side of the frame is covered by another door 42 which includes a portion of top 32 and the entire other side 36. Door 42 is hinged near back cover 38 so that when door 42 is opened, the top, side and front of freeze wheel 16 may be readily accessed for cleaning, inspection and/or maintenance purposes. The frame 12 and doors 40 and 42 also cooperate to form a cabinet that encloses the freeze wheel 16 to prevent contaminants from reaching the wheel. The buildup of frost and moisture may also be prevented by purging the sealed cabinet with an inert gas which also can be used to provide a sterile atmosphere therein.

Figure 3:
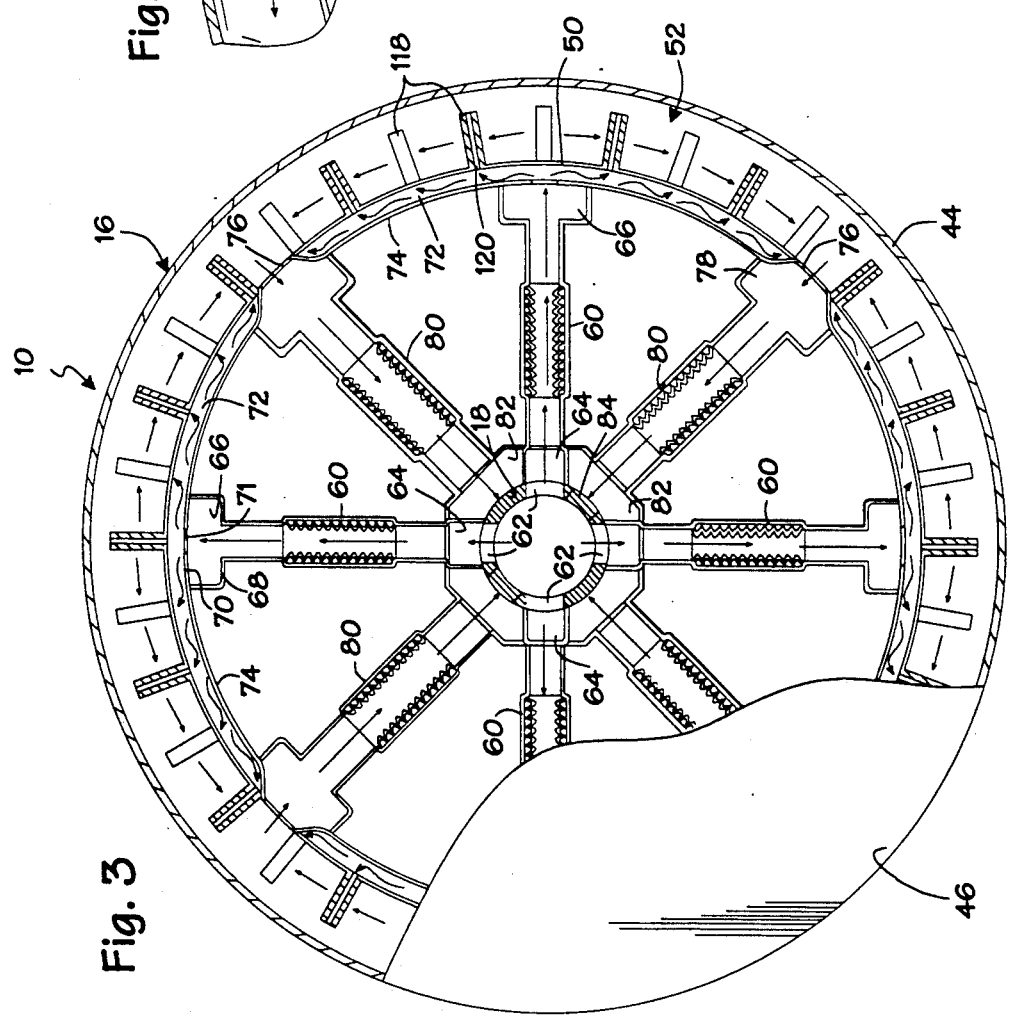
FIG. 3 is an enlarged front elevational view of the freeze wheel with a portion of the end plate broken away to show the arrangement of internal components and with the circulation flow of the refrigerant fluid shown by the arrows.

Turning additionally to FIGS. 3 and 7, a preferred embodiment of freeze wheel 16 will now be described. Wheel 16 comprises an outer skin 44 formed of stainless steel or other materials having a high heat transfer capacity. As can be see in FIG. 7, the outer skin 44 is supported by a pair of end plates 46 and a plurality of circumferentially extending structural rings 48. A circumferential wall 50 is spaced radially inward from the outer skin 44 and is also supported by end plates 46 and structural rings 48.

The space between skin 44 and wall 50 forms a chamber 52 which is filled with a circulating low pressure heat transfer fluid to chill the outer skin 44. The chamber 52 is divided into a plurality of circumferentially extending circulation zones 54, 56 and 58 by the structural rings 48 which are impermeable to the flow of the refrigerant fluid and act as a barrier to prevent migration of refrigerant fluid from one zone to another.

Refrigerant fluid is supplied to the circulation chamber 52 by way of the center shaft 18 and supply conduits 60 that radiate in a spoke-like fashion from the shaft. A plurality of apertures 62 are provided in the shaft 18 to first direct the supply refrigerant into one of four distribution channels 64 arrayed about the shaft and extending substantially along the entire length of wheel 16. Each distribution channel is provided with two supply conduits 60, one of such conduits being positioned at both ends of the respective channel. The conduits 60 then direct the refrigerant to one of four outer distribution channels 66 which likewise extend the length of wheel 16.

Each such outer channel 66 is defined by an inner channel wall 68 and an outer channel wall 70. The outer channel wall 70 includes a plurality of slits 71 which distribute the refrigerant fluid to an associated pressure plenum 72. Each plenum 72 is defined by the wall 50 which also defines the circulation chamber 52 and a wall 74 spaced inwardly therefrom and which includes inner channel wall 68. Plenum 72 extends circumferentially around the wheel 16 and across the length thereof.

Like circulation chamber 52, plenum 72 is divided into a plurality of zones by the structural rings 48.

Spent refrigerant is removed from zones 54, 56 and 58 in circulation chamber 52 by a plurality of exit ports 76 which extend between wall 50 and wall 72. The fluid then flows directly into a return channel 78 that extends across the length of wheel 16 and is in communication with exit ports 76 in each of zones 54, 56 and 58. A pair of return conduits 80, one at each end of the associated channel 78, direct the refrigerant from each of channels 78 to one of four inner return channels 82. Inner channels 82 lie along center shaft 18 and are in communication with a series of apertures 84 formed therein. The return channels 78 and 82 are of larger volume than distribution channels 64 and 68 to insure a pressure drop thereacross, thereby facilitating circulation of the refrigerant fluid through the wheel 16.

Turning additionally to FIG. 2, the refrigerant fluid is directed to the freeze wheel 16 from a storage vessel 86 through a supply line 88. A pump 90 is provided in line 88 to provide the pressure necessary to cause the desired circulation of the fluid. A return line 92 directs the fluid that has circulated through the wheel back to the storage vessel 86. The refrigerant is chilled by $CO_2$ injection by a suitable apparatus 94 as it is returned to the storage vessel. By controlling the rate of $CO_2$ injection, the temperature of the fluid may be maintained at the desired temperature in the storage vessel. Using this type of refrigeration system, the temperature of the refrigerant may be lowered to as low as approximately −110 degrees F.

Returning to FIG. 7, a rotary union assembly 96 is provided for connecting the supply and return lines 88 and 9 together in a manner to permit refrigerant to be supplied to and removed from the wheel 16 at just one end of the center shaft 18. This permits the area around the front and sides of apparatus 10 to be free of refrigerant lines and allows the use of doors 40 and 42 to provide generally unimpeded access to the freeze wheel 16. The assembly 96 includes a stationary hub 98 which joins together a return line fitting 100 and a supply line fitting 102 with shaft 18 in a manner that allows supply flow to be directed through an inlet line 104 positioned within shaft 18 and return flow to be directed through an annular region 106 surrounding the inlet line 104. The annular region 106 is in communication with the apertures 84 which direct return flow of refrigerant into the shaft 18 while the inlet line is in communication with apertures 62 which direct supply fluid from the shaft into distribution channels 64. A suitable seal 107 is provided at the end of line 104 to separate the annular region 106 from an accumulation chamber 108 formed for the supply fluid within shaft 18.

The wheel 16 is supported for rotation by a plurality of bearings 110 on shaft 18. Turning again to FIG. 2, the shaft is rotated by a drive sprocket 112 which is turned by a belt drive 114 or other suitable mechanism. A similar drive mechanism 116 is also provided for turning the drive roller 23 for belt 20 (FIG. 1).

Turning to FIGS. 3 and 4, it can be seen that a plurality of nozzles 118 are mounted on wall 50 and extend in chamber 52 toward outer skin 44. Openings 120 are provided in wall 50 to permit refrigerant fluid to flow from pressure plenums 72 through nozzles 118 and into chamber 52. The nozzles are preferably of a length greater than one half of the distance between wall 50 and the inner surface of skin 44 to minimize mixing of fluid already in the chamber with fluid directed from nozzles 118 toward the inner surface. By minimizing this mixing, the refrigerant contacting the inner surface of the skin remains at a colder temperature than would otherwise be obtained if the were to mix with the warmer fluid already circulating in chamber 52.

As best illustrated in FIG. 4, the fluid exiting nozzles 118 travels the short distance to the outer skin 44 where it impinges upon the inner surface of the skin at substantially a zero degree angle of incidence. The fluid impinging upon the inner surface acts to prevent formation of a boundary layer of warmer refrigerant at the inner surface. The impinging refrigerant then propagates outwardly from the area of impact in a turbulent fashion to further impede the formation of a warm boundary layer. The radiating refrigerant also adheres to the inner surface of the skin to maximize heat transfer between the outer skin 44 and the refrigerant. This refrigerant fluid, upon contact with fluid radiating from adjacent nozzles, drops away from the inner surface of the skin and migrates toward the exit ports 76 for removal from chamber 52.

Figure 5:
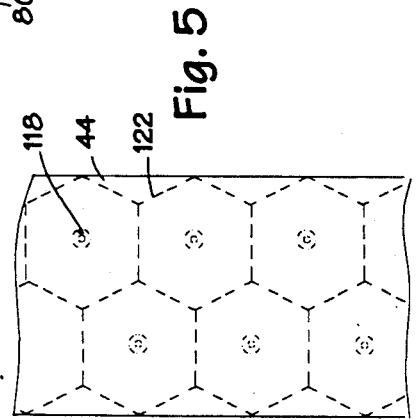
FIG. 5 is a fragmentary side elevational view of the outer skin of the freeze wheel taken along line 5—5 of FIG. 4 in the direction of the arrows and showing the hexagonal freeze rings formed by the flow pattern of the refrigerant from the distribution nozzles.

Turning to FIG. 5, the spacing and arrangement of nozzles 118 provides a well defined hexagonal boundary ring or structure 122 which forms as refrigerant propagating in a circular pattern from one nozzle contacts propagating refrigerant from adjacent nozzles. This boundary formation can clearly be seen as water on the outer skin begins to freeze and becomes opaque first at a point directly above a nozzle 118 and then radiating outward therefrom. It will of course be appreciated that an incomplete hexagonal structure is formed when only two circumferential rings of nozzles are provided in communication with each other.

The refrigerant fluid used in the present invention may comprise many types of thermal fluids. The preferred fluid is d-limonene but other fluids may be used provided they have the necessary density and viscosity at the chosen operating temperatures to provide the desired flow pattern along the inner surface of the outer skin 44. When $CO_2$ injection is used to chill the refrigerant, it is desirable that the fluid chosen remain liquid below the triple point of $CO_2$ in order to prevent solidification of the thermal fluid. A product available under the trademark Dowtherm from the Dow Chemical Co. is another example of a suitable thermal fluid.

To facilitate uniform heat transfer and to achieve the hexagonal freeze structures 122, the nozzles 118 are preferably arrayed in a plurality of concentric rings about the wheel. The nozzles in immediately adjacent rings are offset so an equilateral triangle is formed by a line connecting the three nozzles closest to a given point in the circular plan in which the nozzle lie. The nozzles in alternating rings thus lie in parallel lines which are perpendicular to the direction of rotation of the wheel 16. This nozzle arrangement, in conjunction with parameters such as the density and viscosity of the refrigerant, allows the refrigerant to impinge upon the inner surface of skin 44 and propagate outwardly but parallel to the skin surface to strip away the warmed refrigerant across the entire surface to ensure uniform cooling of the product placed on the outer skin 44.

As an example of suitable nozzle diameters and spacings, it has been determined that good heat transfer is achieved with nozzles having an inner diameter of 0.094 inch, an outer diameter of 0.250 inch, a length of 1.25 inches, a distance of 0.375 inch between the nozzle tip and the inner surface of the outer skin, a distance of 2.85 inches between adjacent nozzles with the same ring, a distance of 3.11 inches between nozzles in adjacent rings, and a flow rate of 0.95 GPM/nozzle.

In operation, the freeze wheel 16 is supplied with chilled refrigerant which is circulated through the wheel to chill the outer skin 44 thereof to a temperature of to $-90$ degrees F or even to $-100$ degrees F. A product applied to the circulating wheel is placed in contact with the very low temperature skin 44 and is quickly frozen and further reduced in temperature. By reducing the temperature of the product to a very low temperature, a significant amount of bacteria, particularly mold and yeast spores, can be killed, thereby prolonging the freshness of the product after it has been thawed. Notably, it has been found that the bacteria count of a scrambled egg product applied to the wheel can be reduced from 100,000 per gram of product down to 100 per gram of product after freezing.

It can be seen that the use of nozzles 118 to direct the refrigerant directly onto the outer skin allows a lower temperature to be achieved than would be possible if the supply refrigerant were allowed to mix with refrigerant that has already been warmed by heat exchange with the outer skin. By directing the refrigerant directly onto and along the outer skin, the nozzles 118 also prevent the formation of a boundary layer of warmed refrigerant. This greatly facilitates and maximizes heat transfer between the refrigerant and the outer skin 44. It has been found that very high heat transfer rates can be achieved, remarkably, rates as high as 14,000 to 16,000 BTU/hr/ft$^2$ and even up to 21,000 BTU/hr/ft2 have been achieved. Such rates are much higher than can be achieved even with conventional high pressure freeze wheels, yet the freezing apparatus 10 in accordance with the present invention operates at low pressures in the range of approximately 20 to 25 psi at the pump 90 outlet, 12 to 20 psi at the inlet to wheel 16, and 2–5 psi at the outlet from the wheel. These low pressures significantly reduce the likelihood of rupturing of any of the components that carry the heat transfer fluid, yet the fluid circulation still provides the extremely high heat transfer rates across the outer skin 44.

The very high heat transfer rates and the very low temperatures achieved by freezing apparatus 10 allow a product placed on the wheel to be quickly frozen. The freezing can occur at such a rapid rate that rupturing of the product cells is significantly reduced or eliminated. This allows the product when thawed to return to its original consistency and texture. For example, a scrambled egg product placed on the wheel 16 and rotated therewith freezes and is removed from the wheel as a plurality of flakes which can be milled to form a powder. When the powder is thawed, it forms an egg product having the same consistency, texture and flavor as the original product. Similarly, milk can be frozen so quickly on wheel 16 that it does not separate into its water and cream components. This allows the frozen milk to be more readily stored for extended periods of time and then returned to its original freshness and consistency upon thawing.

The use of a plurality of circulation zones 54, 56 and 58 across the wheel as well as the plurality of exit ports 76 within each zone enhances the uniform cooling of the outer skin 44 and product placed thereon by further reducing the mixing of the spent refrigerant fluid with the newly charge fluid. After fluid has been directed from the nozzles 118 onto the inner surface of skin 44, it travels only a short distance before exiting chamber 52 through one of ports 76. Likewise, the use of individual pressure plenums 72 to supply the refrigerant to each zone 54, 56 and 58 ensures a uniform distribution pressure at each nozzle within the zones. This prevents undesired channeling of the fluid to isolated regions within the zones and ensures a uniform distribution of refrigerant onto outer skin 44.

It will be apparent that various product applications are possible for wheel 16. For example, the wheel may be used to control the temperature of reactants in a reaction process that requires precise control over the temperature of reaction. Another application involves the freezing of photographic film gel. Of course, the wheel is also readily adapted for use with food products in the form of liquids, slurries, and solids.

The invention will be further described in the following example which is for purposes of illustration and not limitation:

EXAMPLE

The following design parameters and values have been determined for a freeze wheel having a diameter of 0.5 meter and a distance across the outer skin of 0.5 meter:

| | |
|---|---|
| refrigerant fluid required | 0.95 GPM/nozzle |
| total number of nozzles | 120 (6 rings @ 20 each) |
| storage tank to pump velocity | 5 ft/sec |
| pump to freeze wheel velocity | 11 ft/sec |
| wheel to tank return velocity | 10 ft/sec |
| minimum acceptable pipe schedule | #40 |
| surface area of outer skin | 8.45 sq. ft |

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A freeze wheel comprising:
   a circumferential skin for receiving a substance to be chilled or frozen;
   a chamber formed between the skin and a circumferential wall spaced from the skin;
   a plurality of nozzles protruding into the chamber for directing a refrigerant fluid from the chamber onto the skin; and
   a port in the circumferential wall for removing the refrigerant fluid from the chamber.

2. The freeze wheel of claim 1, wherein the nozzles are mounted on the circumferential wall.

3. The freeze wheel of claim 2, wherein the skin is positioned radially outward from the circumferential wall.

4. The freeze wheel of claim 3, including a central distribution shaft for carrying the refrigerant fluid and conduits coupling the shaft to the nozzles for directing the refrigerant fluid from the shaft to the nozzles.

5. The freeze wheel of claim 4, wherein the nozzles are arranged in a plurality of concentric rings extending around the circumference of the wheel.

6. The freeze wheel of claim 5, wherein the nozzles in alternating rings lie in rows perpendicular to the direction of rotation of the wheel.

7. The freeze wheel of claim 5, including a plurality of circulation zones formed in the chamber, each said zone extending around the circumference of the wheel and being separated from an adjacent zone by a barrier which is impermeable to flow of the refrigerant fluid.

8. The freeze wheel of claim 7, including a plurality of said ports circumferentially spaced apart in each said zone for removal of fluid therefrom.

9. The freeze wheel of claim 8, including a distribution channel connecting a conduit to a plurality of nozzles.

10. The freeze wheel of claim 9, including a pair of spaced apart conduits connected to the distribution channel.

11. The freeze wheel of claim 10, including a plurality of distribution channels circumferentially spaced about the wheel.

12. The freeze wheel of claim 11, wherein at least one of the distribution channels is in communication with nozzles in a plurality of zones.

13. The freeze wheel of claim 4, wherein the central distribution shaft includes an elongated outer wall having a plurality of apertures and forming a conduit having a closed end, an inner dividing wall separating the conduit into first and second regions, and an inlet pipe extending axially within the conduit, said inlet pipe extending through the first region and the dividing wall to communicate with the second region, whereby refrigerant fluid can be supplied through the inlet pipe into the second region for distribution through the apertures therein to some of said conduits and refrigerant fluid can be directed from other of said conduits through the apertures in the first region into an annular space in the first region surrounding the inlet pipe for removal from the wheel.

14. The freeze wheel of claim 13, including a rotary union coupled with the outer wall and the inlet pipe.

15. A method for operating a freeze wheel, said method comprising the steps of:
   rotating the freeze wheel;
   circulating a refrigerant fluid through the rotating freeze wheel;
   cooling an exterior skin of the freeze wheel by directing the circulating refrigerant fluid onto a surface of the exterior skin through a plurality of nozzles which extend into a chamber formed between the skin and a circumferential wall spaced from the skin, said circulating refrigerant fluid being directed onto said surface in a manner to substantially prevent the formation of a stationary boundary layer of refrigerant fluid adjacent the surface;
   applying a product to the cooled exterior skin of the freeze wheel to cool the product by heat transfer with the exterior skin; and
   removing the cooled product form the exterior skin of the freeze wheel.

16. The process of claim 15, including the step of cooling the product applied to the exterior skin of the wheel to a temperature of $-90$ degrees F.

17. The process of claim 1.5, including the step of circulating the refrigerant fluid through a plurality of circulation zones.

18. The process of claim 17, including the step of both directing the refrigerant fluid to the wheel and removing the circulated refrigerant fluid therefrom at one end of a shaft on which the wheel rotates.

19. The process of claim 15, including the step of supplying the refrigerant to the wheel at an inlet pressure within the range of approximately 12 to 20 psi.

20. The process of claim 19, including the step of removing the refrigerant from the wheel at an outlet pressure within the range of approximately 2 to 5 psi.

21. A freezing apparatus comprising in combination a freeze wheel and means coupled with the freeze wheel for effecting rotation thereof, said freeze wheel comprising:
- a circumferential skin for receiving a substance to be chilled or frozen;
- a chamber formed between the skin and a circumferential wall spaced from the skin;
- a plurality of nozzles protruding into the chamber for directing a refrigerant fluid from the chamber onto the skin; and
- a port in the circumferential wall for removing the refrigerant fluid from the chamber.

22. The freezing apparatus of claim 21, wherein the nozzles are mounted on the circumferential wall.

23. The freezing apparatus of claim 22, wherein the skin is positioned radially outward from the circumferential wall.

24. The freezing apparatus of claim 23, including a central distribution shaft for carrying the refrigerant fluid and conduits coupling the shaft to the nozzles for directing the refrigerant fluid form the shaft to the nozzles.

25. The freezing apparatus of claim 24, including a plurality of circulation zones formed in the chamber, each said zone extending around the circumference of the freeze wheel and being separated form an adjacent zone by a barrier which is impermeable to flow of the refrigerant fluid.

26. The freezing apparatus of claim 25, including a plurality of ports in the circumferential wall associated with each said zone for removal of fluid therefrom.

27. The freezing apparatus of claim 26, including a distribution channel connecting one of the conduits to a plurality of nozzles.

28. The freezing apparatus of claim 27, wherein two of the conduits are spaced apart and are connected to the distribution channel.

29. The freezing apparatus of claim 28, including a plurality of distribution channels circumferentially spaced about the freeze wheel.

30. The freezing apparatus of claim 29, wherein at least one of the distribution channels is in communication with nozzles in a plurality of zones.

31. The freezing apparatus of claim 30, wherein the central distribution shaft includes an elongated outer wall having a plurality of apertures and forming a conduit having a closed end, an inner dividing wall separating the conduit into first and second regions, and an inlet pipe extending axially within the conduit, said inlet pipe extending through the first region and the dividing wall to communicate with the second region, whereby refrigerant fluid can be supplied through the inlet pipe into the second region for distribution through the apertures therein to some of said conduits and refrigerant fluid can be directed from other of said conduits through the apertures in the first region into an annular space in the first region surrounding the inlet pipe for removal from the freeze wheel.

32. The freezing apparatus of claim 30, wherein the nozzles are arranged in a plurality of concentric rings extending around the circumference of the freeze wheel.

33. The freezing apparatus of claim 32, wherein the nozzles in alternating rings lie in rows perpendicular to the direction of rotation of the wheel.

* * * * *